US009500100B2

(12) United States Patent
Carter et al.

(10) Patent No.: US 9,500,100 B2
(45) Date of Patent: Nov. 22, 2016

(54) APPARATUS AND METHOD FOR ASSEMBLING A DAMPER BEARING ASSEMBLY

(71) Applicant: GENERAL ELECTRIC COMPANY, Schenectady, NY (US)

(72) Inventors: Bruce Alan Carter, Cincinnati, OH (US); Ravindra Shankar Ganiger, Bangalore (IN); Stephanie Frances Drummond, Lynn, MA (US); Vivek Nema, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/396,784

(22) PCT Filed: Apr. 22, 2013

(86) PCT No.: PCT/US2013/037581
§ 371 (c)(1),
(2) Date: Oct. 24, 2014

(87) PCT Pub. No.: WO2013/163078
PCT Pub. Date: Oct. 31, 2013

(65) Prior Publication Data
US 2015/0098826 A1 Apr. 9, 2015

Related U.S. Application Data

(60) Provisional application No. 61/637,970, filed on Apr. 25, 2012.

(51) Int. Cl.
*F16C 19/04* (2006.01)
*F16C 43/04* (2006.01)
(Continued)

(52) U.S. Cl.
CPC ............ *F01D 25/164* (2013.01); *F16C 19/04* (2013.01); *F16C 27/045* (2013.01); *F16C 43/04* (2013.01); *F16C 19/06* (2013.01); *Y02T 50/671* (2013.01); *Y10T 29/49229* (2015.01)

(58) Field of Classification Search
CPC ............... Y02T 50/671; F01D 25/164; Y10T 29/49229; F16C 43/04; F16C 19/04; F16C 2226/60; F16F 15/1201; F16F 15/1208; F16F 15/13185

USPC ......... 384/99, 215, 481, 487, 510, 535, 537; 416/174; 29/888
See application file for complete search history.

(56) References Cited

U.S. PATENT DOCUMENTS 3,309,154 A * 3/1967 Stokely ................. F16C 27/066
384/536
3,652,139 A 3/1972 James
(Continued)

FOREIGN PATENT DOCUMENTS

CN 101008350 A 8/2007
EP 1167788 A1 1/2002
(Continued)

OTHER PUBLICATIONS

International Search Report and Written Opinion dated Jul. 18, 2013 which was issued in connection with PCT Application No. PCT/US2013/037581 which was filed on Apr. 22, 2013.
(Continued)

*Primary Examiner* — Marcus Charles
(74) *Attorney, Agent, or Firm* — General Electric Company; William Scott Andes

(57) ABSTRACT

A damper bearing assembly for a gas turbine engine is disclosed. The damper bearing assembly is designed to define forward and aft axial gaps which allow for normal deflection under standard operating thrust loads, but then close during a fan blade out event to allow the increased load to transfer to the damper housing. Frictional forces between contacting parts limit torsional windup and increase torsional resistance with increasing load. The damper bearing assembly includes a damper housing configured substantially within a U-shaped spring finger housing and a spanner nut with a radial hook portion coupled to the spring finger housing. The damper housing is coupled to the spring finger housing such that it is substantially confined within the U-shaped void. The spanner nut is coupled to the spring finger housing such that the radial hook portion is configured to limit the deflection of the spring finger housing and damper housing during a fan blade out event.

17 Claims, 2 Drawing Sheets

(51) Int. Cl.
  *F01D 25/16* (2006.01)
  *F16C 27/04* (2006.01)
  *F16C 19/06* (2006.01)

(56) References Cited

U.S. PATENT DOCUMENTS

| | | | | |
|---|---|---|---|---|
| 4,406,459 A | * | 9/1983 | Davis | F16J 15/3404 277/401 |
| 4,406,460 A | * | 9/1983 | Slayton | F16J 15/164 277/401 |
| 4,523,864 A | * | 6/1985 | Walter | F16C 19/54 384/513 |
| 4,815,903 A | * | 3/1989 | Skidmore, Sr. | B23Q 1/70 409/131 |
| 4,854,751 A | * | 8/1989 | Grassmuck | F16C 27/066 384/476 |
| 4,890,709 A | * | 1/1990 | Reik | F16C 19/52 192/113.4 |
| 4,952,076 A | * | 8/1990 | Wiley, III | F01D 25/164 384/535 |
| 4,971,457 A | | 11/1990 | Carlson | |
| 4,981,415 A | * | 1/1991 | Marmol | F16C 27/045 384/215 |
| 5,464,227 A | * | 11/1995 | Olson | F16J 15/3404 277/400 |
| 5,564,903 A | * | 10/1996 | Eccles | F01D 25/164 244/58 |
| 5,622,438 A | * | 4/1997 | Walsh | F01D 25/162 277/635 |
| 5,816,712 A | * | 10/1998 | Brown | F16C 27/066 384/536 |
| 5,868,503 A | * | 2/1999 | Bade | F16C 27/066 384/536 |
| 6,099,165 A | * | 8/2000 | Tremaine | F01D 25/164 384/535 |
| 6,695,478 B2 | | 2/2004 | Bos et al. | |
| 6,910,863 B2 | | 6/2005 | Scardicchio et al. | |
| 7,052,183 B2 | * | 5/2006 | Chen | F16C 27/066 267/141.3 |
| 7,478,952 B2 | * | 1/2009 | Faust | F16C 27/04 384/535 |
| 7,574,854 B2 | | 8/2009 | Moniz | |
| 8,182,153 B2 | * | 5/2012 | Singh | F01D 25/164 384/477 |
| 8,262,353 B2 | | 9/2012 | Storace | |
| 8,337,090 B2 | * | 12/2012 | Herborth | F01D 25/164 384/215 |
| 2004/0200328 A1 | * | 10/2004 | Hugick | B23B 31/201 82/110 |
| 2009/0034896 A1 | | 2/2009 | Fisher et al. | |
| 2010/0220948 A1 | | 9/2010 | Singh et al. | |
| 2013/0022448 A1 | | 1/2013 | Jadczak et al. | |
| 2013/0156574 A1 | | 6/2013 | Antunes et al. | |

FOREIGN PATENT DOCUMENTS

| | | |
|---|---|---|
| EP | 1630357 A2 | 3/2006 |
| EP | 2113639 A2 | 11/2009 |
| EP | 2149681 A2 | 2/2010 |
| FR | 2960907 | 6/2010 |
| FR | 2955615 A1 | 7/2011 |
| GB | 2454327 A | 5/2009 |
| JP | 2004293729 A | 10/2004 |
| JP | 20090133313 A | 6/2009 |

OTHER PUBLICATIONS

Unofficial English Translation of Chinese Office Action issued in connection with corresponding CN Application No. 201380021804.3 on Jun. 4, 2015.
Unofficial English Translation of Japanese Office Action issued in connection with corresponding JP Application No. 2015509060 on Dec. 1, 2015.

* cited by examiner

1

APPARATUS AND METHOD FOR ASSEMBLING A DAMPER BEARING ASSEMBLY

CROSS REFERENCE TO RELATED APPLICATIONS

This application Ser. No. 14/396,784 is a national stage entry of PCT/US13/37581, filed Apr. 22 2013, which claims priority to U.S. Provisional Application No. 61/637,970 filed Apr. 25, 2012, both of which are hereby incorporated by reference in their entirety.

BACKGROUND OF THE INVENTION

The application described herein relates generally to gas turbine engine components, and more specifically to a bearing assembly and a method of assembling a bearing assembly.

Gas turbine engines typically include a fan rotor assembly, a compressor, a combustor, and at least one turbine. The fan rotor assembly includes a fan with an arrangement of fan blades that radially extend outward from a rotor shaft. The compressor may compress air, which may then be mixed with fuel and funneled into a combustion chamber where the mixture may be ignited to generate hot gases, which may then be directed to the turbine. The turbine uses the hot gases to power the compressor, and/or to power the rotor shaft and the fan to propel an aircraft in flight.

The rotor shaft is typically supported by a plurality of damper bearing assemblies. Known damper bearing assemblies include a plurality of spring fingers attached between a mounting flange and a bearing housing. During normal engine operation, the damper bearing assembly acts to retain the rotor shaft's axial position and also acts to provide radial damping of the fan/rotor system. A traditional design approach includes an axial spring finger housing combined with a radial squeeze film oil damper that is able to withstand relatively small unbalance load situations. A spanner nut is used to clamp the bearing into the spring finger housing. During these normal operating conditions, the squeeze film damper bearing requires clearance in all directions around the bearing (axial and radial) for dynamic operation. However, in a potential failure mode of a liberated fan blade, relatively high radial loads combined with relatively high overturning moments may result in damage to gas turbine engine components. The radial load closes the damper gap and creates a harmonic drive effect that loads the spring fingers in torsion. The overturning moment creates high axial loads on the bearing and support structure resulting in an opposing sinusoidal load distribution which buckles the spring fingers. The radial load also causes severe deformation of the structure to allow separation of the threads resulting in spanner nut liberation.

More efficient engines that rotate at faster speeds than previous designs create both larger radial loads and larger overturning moments during a fan blade out event. Accordingly, there remains a need for a bearing support structure with a spring finger housing which is lightweight, but is able to withstand the high radial and overturning moment loads of a fan blade out event.

BRIEF DESCRIPTION OF THE INVENTION

In one aspect, a bearing assembly for a gas turbine engine is provided. The bearing assembly comprises a spring finger housing, a damper housing, and a spanner nut. The spring finger housing comprises a first portion and a second portion that are coupled together such that the first portion is substantially perpendicular to the second portion. The damper housing includes a radially inner platform comprising an aft face, a forward face, and a radially inner surface positioned therebetween. Further, the damper housing is coupled within the spring finger housing such that a first axial gap is defined between the forward face and the first portion. The spanner nut is coupled to a radially inner surface of the second portion. The spanner nut includes a hook portion that defines a second axial gap between the aft face and the hook portion.

In another aspect, a method of assembling a bearing assembly for a gas turbine engine is provided. The method comprises providing a spring finger housing that includes a first portion and a second portion coupled together such that the first portion is substantially perpendicular to the second portion. Further, a damper housing that includes a radially inner platform having an aft face, a forward face, and a radially inner surface positioned therebetween is also provided. The damper housing is coupled within the spring finger housing such that a first axial gap is defined between the forward face and the first portion. The method also includes coupling a spanner nut to a radially inner surface of the second portion. The spanner nut includes a hook portion that defines a second axial gap between the aft face and the hook portion.

In yet another aspect, a rotor assembly is provided. The rotor assembly comprises a rotor shaft and a bearing assembly configured to support the rotor shaft. The bearing assembly comprises a spring linger housing, a damper housing, and a spanner nut. The spring finger housing comprises a first portion and a second portion that are coupled together such that the first portion is substantially perpendicular to the second portion. The damper housing includes a radially inner platform comprising an aft face, a forward face, and a radially inner surface positioned therebetween. Further, the damper housing is coupled within the spring finger housing such that a first axial gap is defined between the forward face and the first portion. The spanner nut is coupled to a radially inner surface of the second portion. The spanner nut includes a hook portion that defines a second axial gap between the aft face and the hook portion.

DETAILED DESCRIPTION OF THE INVENTION

Figure 1:
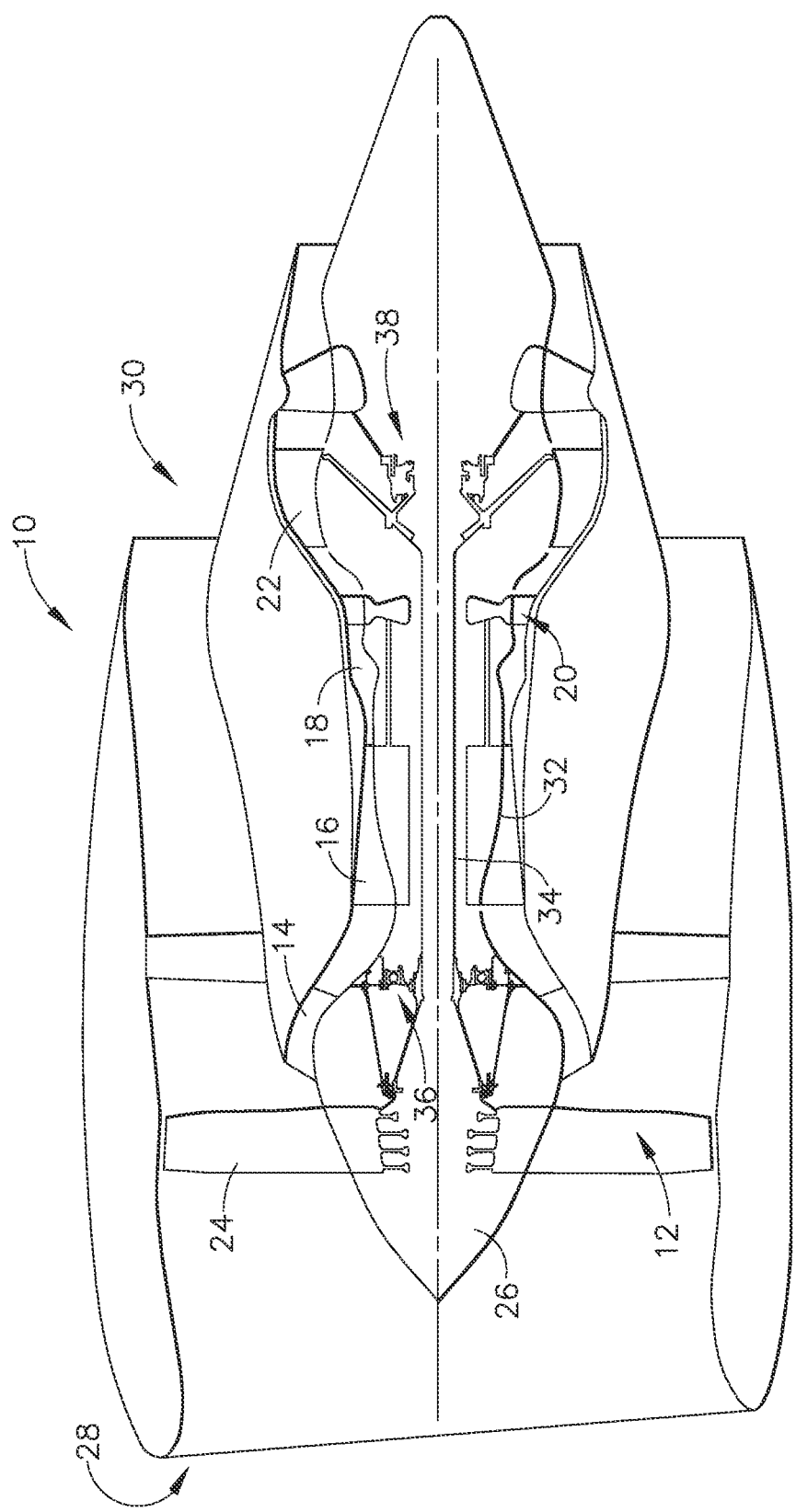
FIG. 1 is a cross-sectional schematic illustration of an exemplary gas turbine engine.

FIG. 1 is a schematic illustration of an exemplary gas turbine engine 10 including a fan assembly 12, a booster 14, a high pressure compressor 16, and a combustor 18. The engine 10 also includes a high pressure turbine 20, and a low pressure turbine 22, all in serial flow arrangement. The fan assembly 12 includes an array of fan blades 24 extending radially outward from a rotor disk 26. The engine 10 includes an intake side 28 and an exhaust side 30. In the exemplary embodiment, engine 10 may be, but is not limited to being, a LEAP or P20 gas turbine engine available from General Electric Company. Fan assembly 12, booster 14, and turbine 22 may be coupled by a first rotor shaft 32, and the compressor 16 and turbine 20 may be coupled by a second rotor shaft 34.

In operation, air flows through fan assembly 12 and compressed air is supplied to high pressure compressor 16 through booster 14. The highly compressed air is delivered to combustor 18, where it is mixed with a fuel and ignited to generate combustion gases. The combustion gases are channeled from the combustor 18 to drive the turbines 20 and 22. The turbine 22 drives the fan assembly 12 and booster 14 by way of shaft 32. The turbine 20 drives the compressor 16 by way of shaft 34.

Figure 2:
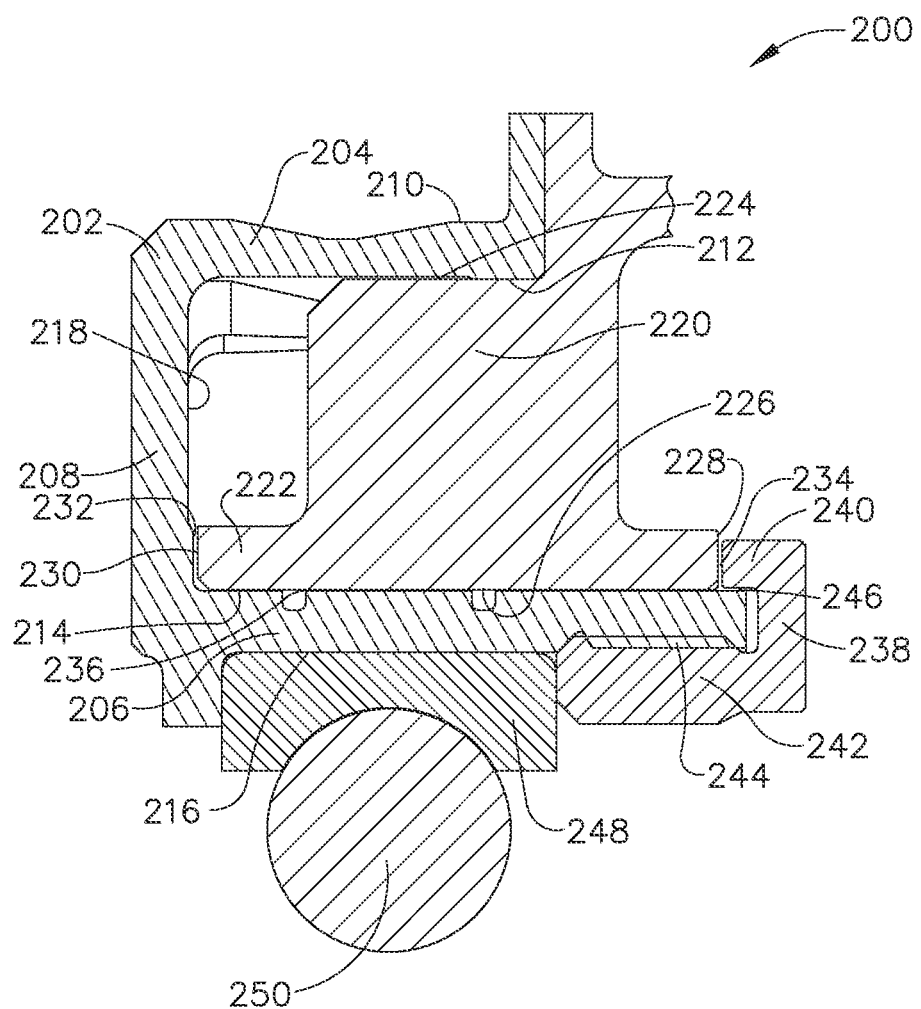
FIG. 2 is a cross-sectional view of a bearing assembly which may be used with the gas turbine engine shown in FIG. 1.

FIG. 2 is a cross-sectional view of a damper bearing assembly 200 which may be used to support one of shafts 32 or 34 of gas turbine engine 10 (shown in FIG. 1). In accordance with an exemplary embodiment of the present invention, damper bearing assembly 200 includes a damper housing 220, a spring finger housing 202, a bearing housing 248, a bearing 250, and a spanner nut 238.

Spring finger housing 202 is an annular ring member that includes an outer member 204, an inner member 206, and an intermediate member 208, which connects inner member 206 and outer member 204. Inner member 206 of spring finger housing 202 includes an inner surface 216 and an outer surface 214. Outer member 204 of the spring finger housing 202 also includes an inner surface 212 and an outer surface 210. Intermediate member 208 of spring finger housing 202 includes an aft surface 218.

Annular damper housing 220 includes a platform 222 that includes a radially inner surface 226 and a radially outer surface 224 that are aligned in a plane parallel to an axial direction. Damper housing platform 222 also includes a forward face 230 aligned in a first plane perpendicular to an axial direction and an aft face 228 aligned in a second plane perpendicular to an axial direction that is spaced axially from the first plane. Damper housing 220 is coupled to spring finger housing 202 such that radially outer surface 224 of damper housing 220 and inner surface 212 of outer member 204 of spring finger housing 202 are abutting with one another. Damper housing 220 and spring finger housing 202 are also coupled in such a way that a radial clearance 236 is defined between platform radially inner surface 226 of damper housing 220 and outer surface 214 of inner member 206 of spring finger housing 202. When damper housing 220 and spring finger housing 202 are coupled in such a way, a forward axial gap 232 is defined between forward face 230 of radially inner platform 222 and aft surface 218 of intermediate member 208 of spring finger housing 202.

Spanner nut 238 is an annular ring member that includes a radial hook portion 240 and a main body portion 242. Main body portion 242 is coupled to inner surface 216 of inner member 206 of spring finger housing 202 by a threaded surface 244 so that hook portion 240 of spanner nut 238 wraps around the end of inner member 206 of spring finger housing 202 and is adjacent to outer surface 214 of inner member 206 of spring finger housing 202 and aft face 228 of radially inner platform 222. Radial hook portion 240 of spanner nut 238 is positioned such that a radial gap 246 is defined between radial hook portion 240 and outer surface 214 of inner member 206 of spring finger housing 202 and an axial gap 234 is defined between radial hook portion 240 and aft face 228 of radially inner platform 222.

Main body portion 242 of spanner nut 238 is situated adjacent to bearing housing 248 where bearing housing 248 is coupled to inner surface 216 of inner member 206 of spring finger housing 202. Bearing 250 is positioned within bearing housing 248.

During a fan blade out event, rotor 26 of engine 10 (shown in FIG. 1) is out of balance and produces large radial loads and large overturning moments. Damper bearing assembly 200 uses a lightweight spring finger housing 202 design to withstand such large radial loads and overturning moments. Bearing assembly 200 defines axial gaps 232 and 234 on both forward face 230 and aft face 228 of radially inner platform 222 which limit deflection of damper housing 220 and cause frictional forces which self arrest the distortion of spring finger housing 202 during a fan blade out event. Spanner nut 238 also defines a radial gap 246 to limit the radial thread separation due to the high radial loads of a fan blade out event. During standard engine 10 operation, axial gaps 232 and 234 and radial gap 246 allow damper housing 220 to deflect in a radial direction within the limits of a film damper gap (not shown) for fan rotor unbalance. Axial gaps 232 and 234 allow for normal damper housing deflection during standard engine 10 operation, but axial gaps 232 and 234 close under the high loads of a fan blade out event to transfer the load into damper housing 220. Frictional forces between damper housing 220, radial hook portion 240, and spring finger housing 202 limit torsional windup and increase torsional resistance with increasing load.

During a fan blade out event, the high overturning moment acts to push spanner nut 238 in an axial direction, which causes a deflection of spring finger housing 202. When spring finger housing 202 is deflected, significant loads may cause threaded surface 244 of spanner nut 238 to fail. The use of radial hook portion 240 on spanner nut 238 allows spanner nut 238 to travel with deflected spring finger housing 202 and alleviate the load on threaded surface 244.

Because spanner nut 238 deflects with spring finger housing 202 and resists failure caused by the overturning moment, the torque from the overturning moment is transferred to spring finger housing 202. Spring finger housing 202 is necessary to create radial softness for the damping of vibrations, but it is also in failure mode due to the high overturning moment that can buckle spring finger housing 202. The harmonic drive effect that occurs because of the overturning moment causes a torsional twist in spring finger housing 202. When an overturning moment acts at a first point on annular damper bearing assembly 200, damper housing 220 is deflected forward and forward axial gap 232 is closed. At a second point, opposite the first point, on annular damper bearing assembly 200, damper housing 220 is deflected in the aft direction and aft axial gap 234 is closed. U-shaped spring finger housing 202 and radial hook portion 240 of spanner nut 238 act as a stop to limit deflection of damper housing 220 in the axial direction and the frictional forces caused by the closure of forward 232 and aft 234 axial gaps act to arrest the wind up of spring finger housing 202 and ensures that damper bearing assembly 200 is able to survive a fan blade out event.

Besides the ability to survive a fan blade out event, other advantages of damper bearing assembly 200 are its compact design and light weight structure. The U-shaped design of spring finger housing 202 allows damper housing 220 to be coupled substantially within spring finger housing 202, therefore causing damper bearing assembly 200 to take up less space inside engine 10. Also, in order for a damper bearing assembly of conventional design to sustain the large radial loads and high overturning moments of a fan blade out event, a spanner nut would need to be larger and a spring finger longer than those depicted in FIG. 2. The use of U-shaped spring finger housing 202 and spanner nut 238 with radial hook portion 240 in damper bearing assembly 200 as shown in FIG. 2 requires less material, and is therefore lighter, than a traditional damper bearing assembly designed to survive the same large radial loads and high overturning moments than occur in a fan blade out event.

Additional advantages of damper bearing assembly 200 as pictured in FIG. 2 is the reduction in complexity of engine 10 and the diminishing of cabin noise as a result of damper bearing 200 being placed in a number one position 36, that is, in the forward part of engine 10. Historically, there has been a ball bearing 250 in number one position 36 to carry the thrust load of fan 12, but it was hard mounted. The bearing was bolted in place and there was no damper bearing with the axial and radial gaps or the spring finger housing structure. A damper bearing was added in a number two position 38, that is, further back in the engine, on that the bearings could survive a fan blade out event. The hard mounted ball bearing in number one position 36 caused a non-synchronous vibration that manifested itself as a whining noise in the cabin of the aircraft. In order to reduce the complexity of engine 10 and to diminish the cabin noise, damper bearing assembly 200 shown in FIG. 2, designed to survive large radial loads and high overturning moments caused by fan blade out events, is inserted in number one position 36.

Exemplary embodiments of methods and apparatus for assembling a damper bearing assembly 200 are described above in detail. Damper bearing assembly 200 is not limited to the specific embodiments described herein, but rather, components of damper bearing assembly 200 may be utilized independently and separately from other components described herein. For example, bearing 250 described herein may have other industrial and/or consumer applications and is not limited to practice with damper bearing assembly 200 for gas turbine engine 10 as described herein. Rather, bearing 250 can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bearing assembly for a gas turbine engine, said assembly comprising:
    a spring finger housing comprising a first portion and a second portion, wherein said first portion is substantially perpendicular to said second portion;
    a damper housing including a radially inner platform comprising an aft face, a forward face, and a radially inner surface positioned therebetween, said damper housing coupled within said spring finger housing such that a first axial gap is defined between said forward face and said first portion; and
    a spanner nut coupled to a radially inner surface of the second portion, wherein said spanner nut includes a hook portion that defines a second axial gap between said aft face and said hook portion, and wherein said hook portion and said spring finger housing second portion define a radial gap therebetween.

2. The bearing assembly in accordance with claim 1, wherein said spring finger housing has a substantially U-shaped cross section.

3. The bearing assembly in accordance with claim 1, wherein said radial gap is contigured to at least limit separation of said spanner nut and said spring finger housing.

4. The bearing assembly in accordance with claim 1 further comprising a bearing housing coupled to said spring finger housing adjacent said spanner nut.

5. The bearing assembly in accordance with claim 4 further comprising a bearing coupled to said bearing housing.

6. The bearing assembly in accordance with claim 1, wherein at least one of said spring finger housing, said damper housing, and said spanner nut is an annular ring.

7. The bearing assembly in accordance with claim 1, wherein said second portion of said spring finger housing and said radially inner surface of said damper platform define a radial clearance therebetween.

8. The bearing assembly in accordance with claim 1, wherein said first axial gap is configured to dose at a first point on said bearing assembly and said second gap is configured to dose at a second point on said bearing assembly, wherein said first and second axial gaps close simultaneously and said first point is opposite said second point on said annular bearing assembly.

9. A method of assembling a bearing assembly for a gas turbine engine, said method comprising:
    providing a spring finger housing that includes a first portion and a second portion, wherein the first portion is substantially perpendicular to the second portion;
    providing a damper housing including a radially inner platform that includes an aft face, a forward face, and a radially inner surface positioned therebetween;
    coupling the damper housing within the spring finger housing such that a first axial gap is defined between the forward face and the first portion;
    coupling a spanner nut to a radially inner surface of the second portion, wherein the spanner nut includes a hook portion that defines a second axial gap between the aft face and the hook portion; and
    simultaneously closing the first axial gap at a first point on the bearing assembly and closing the second axial gap at a second point on the bearing assembly, wherein the first point is opposite the second point on the annular bearing assembly.

10. The method in accordance with claim 9, wherein the spring finger housing has a substantially U-shaped cross section.

11. The method in accordance with claim 9, wherein coupling a spanner nut to a radially inner surface of a second portion of the spring finger housing further comprises threadably coupling a spanner nut to a radially inner surface of a second portion of the spring finger housing.

12. The method in accordance with claim 9, wherein coupling a spanner nut to a radially inner surface of a second portion of the spring finger housing further comprises defining a radial gap between the spring finger housing second portion and the hook portion.

13. The method in accordance with claim 9 further comprising coupling a bearing housing to the spring finger housing adjacent the spanner nut.

14. A rotor assembly comprising:
a rotor shaft; and
a bearing assembly configured to support said rotor shaft, said bearing assembly comprising:
  a spring finger housing comprising a first portion and a second portion, wherein said first portion is substantially perpendicular to said second portion;
  a damper housing including a radially inner platform comprising an aft face, a forward face, and a radially inner surface positioned therebetween, wherein said damper housing coupled within said spring finger housing such that a first axial gap is defined between said forward face and the first portion;
  a spanner nut coupled to a radially inner surface of the second portion, wherein said spanner nut includes a hook portion that defines a second axial gap between said aft face and said hook portion; and
  a bearing housing coupled to said spring finger housing adjacent said spanner nut.

15. The rotor assembly in accordance with claim 14, wherein said spring finger housing has a substantially U-shaped cross section.

16. The rotor assembly in accordance with claim 14, wherein said hook portion and said spring finger housing second portion define a radial gap therebetween.

17. The rotor assembly in accordance with claim 14, wherein said first axial gap is configured to close at a first point on said bearing assembly and said second gap is configured to close at a second point on said bearing assembly, wherein said first and second axial gaps dose simultaneously and said first point is opposite said second point on annular bearing assembly.

* * * * *

UNITED STATES PATENT AND TRADEMARK OFFICE
CERTIFICATE OF CORRECTION

PATENT NO.        : 9,500,100 B2  
APPLICATION NO.   : 14/396784  
DATED             : November 22, 2016  
INVENTOR(S)       : Carter et al.

Page 1 of 1

It is certified that error appears in the above-identified patent and that said Letters Patent is hereby corrected as shown below:

In the Specification

In Column 2, Line 32, delete "linger" and insert -- finger --, therefor.

In Column 5, Line 17, delete "on that" and insert -- so that --, therefor.

In the Claims

In Column 6, Line 14, in Claim 3, delete "contlgured" and insert -- configured --, therefor.

In Column 6, Line 31, in Claim 8, delete "dose at" and insert -- close at --, therefor.

In Column 6, Line 33, in Claim 8, delete "dose at" and insert -- close at --, therefor.

In Column 8, Line 16, in Claim 17, delete "dose" and insert -- close --, therefor.

Signed and Sealed this  
Twenty-eighth Day of February, 2017

Michelle K. Lee  
*Director of the United States Patent and Trademark Office*